US005616183A

United States Patent [19]

Dieter et al.

[11] Patent Number: 5,616,183

[45] Date of Patent: *Apr. 1, 1997

[54] METHOD OF CLEANING TUBES OR CONDUITS

[75] Inventors: Jerry A. Dieter, Rochester; Jeffery J. Firestone, Royal Oak, both of Mich.

[73] Assignee: Grow Group, Inc., New York, N.Y.

[*] Notice: The term of this patent shall not extend beyond the expiration date of Pat. No. 5,423,919.

[21] Appl. No.: 439,504

[22] Filed: May 11, 1995

(Under 37 CFR 1.47)

Related U.S. Application Data

[63] Continuation of Ser. No. 165,442, Dec. 10, 1993, Pat. No. 5,423,919.

[51] Int. Cl.$^6$ .............................. B08B 9/00; B08B 9/06; C09D 9/00; C09D 9/02
[52] U.S. Cl. ..................... 134/8; 134/22.14; 134/22.19; 134/38
[58] Field of Search ............................. 134/6, 7, 8, 38, 134/10, 22.14, 22.19; 451/36; 252/162, 163, DIG. 8, 174.25, 155

[56] References Cited

U.S. PATENT DOCUMENTS

| 4,481,126 | 11/1984 | Trinh et al. | 252/174.23 |
|---|---|---|---|
| 4,749,510 | 6/1988 | Nelson | 252/166 |
| 4,821,467 | 4/1989 | Woodson et al. | 51/436 |
| 4,965,010 | 10/1990 | Swett | 252/170 |
| 4,968,447 | 11/1990 | Dixon et al. | 252/174.23 |
| 4,999,126 | 3/1991 | Meade | 252/162 |
| 5,015,410 | 5/1991 | Sullivan | 252/166 |
| 5,092,928 | 3/1992 | Spangler | 106/287.34 |
| 5,130,046 | 7/1992 | Boulos et al. | 252/164 |
| 5,188,675 | 2/1993 | Dormon-Brailsford | 134/4 |
| 5,200,477 | 4/1993 | Baker et al. | 526/74 |
| 5,423,919 | 6/1995 | Dieter et al. | 134/8 |

OTHER PUBLICATIONS

"Introducing the First Affordable White Low Density Microspheres" Z-Light Speres™—Data Bulletin (undated).

Primary Examiner—Zeinab El-Arini
Attorney, Agent, or Firm—Reising, Ethington, Barnard & Perry

[57] ABSTRACT

A method for cleaning tubes or vessels utilizes a composition which contains a ceramic particulate spherical or conical in shape in an amount of 1–20 wt % of the total composition, and a liquid organic solvent in an amount of 80–99 wt % of the total composition, wherein the ceramic particulate is dispersed within the liquid solvent and wherein the solvent also has present in it N-methyl-2-pyrrolidone in an amount of 1–15 wt % of the total composition.

11 Claims, No Drawings

METHOD OF CLEANING TUBES OR CONDUITS

CROSS-REFERENCE TO RELATED APPLICATION

This application is a continuation of U.S. application Ser. No. 08/165,442, filed Dec. 10, 1993, now U.S. Pat. No. 5,423,919, entitled COMPOSITION AND METHOD OF CLEANING TUBES OR CONDUITS, which is hereby incorporated by reference.

TECHNICAL FIELD

This invention relates generally to methods and compositions for cleaning or removing adherent material from the inside of a tube, pipe or other conduit. More particularly, this invention provides a method of cleaning paint lines of a paint delivery system by removing paint deposits and other encrustations lodged on the inside surface of the line utilizing organic solvent and particulate materials.

BACKGROUND ART

For various types of conduits, it is often necessary to remove adherent material which has built up within the inner surface during usage. Paint delivery systems often require such a cleaning. Paint deposits generally adhere to the inner surface of the tubes or conduits of the paint delivery system and pose a problem during cleaning.

Paint delivery systems are widely used to provide paint coatings on a large variety of articles of manufacture. Often a single delivery system is used to apply a multitude of paint finishes and colors. To efficiently retool a delivery system from one paint color to the next, the need arises for a rapid method of cleaning the conduit elements of the system.

With paint delivery systems it is desirable that the cleaning method fully remove all residue from the tube so as not to interfere with subsequent coatings.

The various former methods for cleaning the inner surfaces of a tube or conduit can be classified into three categories:

1) solvent methods where the adherent material is chemically dislodged from the inner surface;

2) mechanical removal methods such as scraping, where the adherent material is forcibly extracted from the inner surface; and 3) blasting techniques involving highly pressurized mechanisms that blast a specified area to remove adherent material with the use of pressure.

Mechanical techniques are often limited in their scope of usage. These mechanical techniques require that the device used be of a size and shape to fit within the conduit. Thus mechanical devices are too restrictive for many tubes or conduits. Blasting techniques require complicated machinery and once again the machinery has to be able to fit within the conduit itself to operate, similar problems then exist with this method as with the use of mechanical devices. In contrast, solvent methods have the widest range of application, as the type or shape of conduit poses no barrier.

Typically the surface to be cleaned dictates the type of cleaning method that can be employed. Ideally, however, a delicate method of cleaning would prevent damage or destruction to a variety of underlying substrates and the use of a solvent removal system facilitates cleaning conduits of various shapes and sizes.

In the past, cleaning compositions containing various abrasive materials have been used. The use of an abradant material increases the effectiveness of the composition in removing undesired matter from the surface being cleaned. However, along with the benefits there have also been associated certain problems. Previous attempts at using inorganic materials as an abrasive particulate material have come to no avail. For example, the No. 4,821,467 patent ("No. '467 patent") discloses a control system for liquid propelled abrasive cleaning. The No. '467 patent describes an abrasive cleaning system comprising a pressurized stream of water and propelled sand particles. Using such an embodiment of an inorganic material poses many problems. The use of such abrasives tend to be hard and therefore can damage the pump components or underlying substrate of the surface to be cleaned. Additionally, sand is a relatively dense material which separates out of the cleaning fluid rather than staying in situ.

It is also known to use mica as an abrasive particle within a cleaning system. The use of mica presents the same problem as those associated with the use of sand. Again, such abrasives are usually hard therefore they raise the possibility of damaging the pump components or the underlying substrate being cleaned. Additionally mica, like sand, is a relatively dense material which separates out of the cleaning fluid rather than staying in situ. Keeping the mixture together is thus an obstacle with this type of inorganic material.

In the arena of organic materials, prior art includes U.S. Pat. No. 4,968,447 which describes the use of an organic material dispersed within a solvent mixture. The patent relates to a method of cleaning employing an organic polymeric material dispersed within a liquid vehicle. Organic polymeric materials do not provide sufficient abrasive characteristics and therefore the solvent system takes longer to clean a given tube.

N-methyl-2-pyrrolidone (NMP) has been used as a paint stripper per se. Pat. No. 5,015,410 describes a paint stripper composition containing NMP, aliphatic and aromatic hydrocarbons. The patent states that the benefits of using NMP include that the resultant paint strippers have a low volatility, and low toxicity. The problem lies in that a purely liquid based remover does not have any abrasive properties and therefore more washes are required to strip the paint from any given surface. In sum, the use of an exclusively NMP solvent remover is only moderately effective.

A need exists, therefore, for a cleaning composition that effectively cleans the tubes or conduits without damaging the surface to be cleaned. More particularly, a need exists for a cleaning composition which can clean similar to abradant materials without the harsh side effects.

In accordance, the present invention provides the cleaning properties characteristic of abradant materials with improved cleaning capability but without harsh side effects which may result in damage to pump components or the underlying surface to be cleaned.

SUMMARY OF THE INVENTION

Described is a cleaning composition for cleaning tubes or vessels, comprising a ceramic particulate spherical or conical in shape in an amount of 1–20 wt % of the total composition; a liquid organic solvent in an amount of 80–99 wt % of the total composition, wherein the ceramic particulate is dispersed within the liquid solvent and wherein the solvent may also have present in it N-methyl-2-pyrrolidone in an amount of 1–15 wt % of the total composition.

It is an object of this invention to provide a method and composition which may be used to quickly remove adherent materials such as paint from a tube, pipe or other conduit.

It is also an object of this invention to provide a rapid method of cleaning or removing adherent materials from a tube, pipe or other conduit.

A further object of this invention is to provide a method of cleaning which can be used for tubes or conduits of varying shape and size.

It is a further object of this invention to provide a method of cleaning which is safe for a variety of tubes, pipes or other conduits and which therefore minimizes the damage to the underlying substrate.

It is further an object of this invention, to provide an inexpensive method of cleaning adherent materials from a tube, pipe or other conduit.

To accomplish these and other related objects of the invention, a method and composition for cleaning or removing adherent materials is disclosed. The method may include the use of a cleaning composition prepared from a mixture of N-methyl-2-pyrrolidone with an inorganic material in a solvent mixture.

DESCRIPTION OF THE PREFERRED EMBODIMENT

The cleaning method disclosed includes the use of a solvent having dispersed therein inorganic particles and NMP, where the inorganic particles have a defined shaped that is generally spherical or conical.

Applicants have discovered, in particular, the effectiveness of suspensions of inorganic particulate matter for removing paint from paint lines without scratching the inner surface of the tube or conduit. In particular, the use of a defined shape for the inorganic particulate matter lends superior cleaning results and decreases the likelihood of scratching. The composition may also be used to clean paint processing equipment such as totes, drums and the like.

Moreover, the use of a generally spherical or conical shaped inorganic particle acts to provide increased lubricating properties under the ball bearing effect. The use of a generally spherical inorganic particle also increases the surface area of the particle and thus its ability to come into contact with the adhering material on the surface of the tube.

Additionally, the use of low density inorganic particles does away with former problems associated with the use of inorganic particles. Previously, high density inorganic particles were used which caused problems in solid liquid solvent suspension systems such as the one proposed. By using low density inorganic particles, the particles are more readily kept in suspension with agitation. To achieve this low density the inorganic particulate matter should have a thin wall with a hollow inside.

Furthermore, the use of N-methyl-2-pyrrolidone adds many specific benefits to the method of cleaning. The use of NMP within the solvent system further improves the stripping characteristics of the cleaning composition. NMP is also a solvent having a high flash point. A flash potent is the temperature at which a liquid or volatile solid gives off a vapor sufficient to form an ignitable mixture with the air near the surface of the liquid or within the test container. The need for solvents having high flash points has increased in the paint industry due to an effort to prevent flash fires. In this vein, then the use of NMP in the solvent system may increase the overall flash point of the solvent system.

It has also been discovered that the combination of the solvent, NMP and the inorganic particles unexpectedly produces an extremely fast acting cleaning method which is effective to quickly clean most types of paints. The specific reason for this improved combination of ingredients is not fully understood.

The solvent can consist of various organic materials. It may also contain aqueous materials. As an example of the types of organic materials which can be used, all of the following are suitable: ketones, aldehydes, esters, lactones, terpenes, ethers, lactams, alcohols, aliphatic hydrocarbons, organic acids, amines or amides or aromatic hydrocarbons and the like. More particularly, the use of xylene, aromatic naphtha and acetone have proven useful. The solvent may also comprise an inorganic material.

The organic solvents that may be used are aliphatic alcohols from 1 to 8 carbon atoms such as methanol, ethanol, isopropanol, n-butanol, octanol, and the like; aliphatic ketones such as acetone, methylethyl ketone, methylisobutyl ketone, diisobutyl ketone cyclohexanone and the like; esters such as short chain aliphatic acids reacted with short aliphatic alcohols where the total number of carbon atoms of the acid and the alcohol is approximately 12, such as ethylacetate, butyl acetate, and the like; hydrocarbon solvents such as those containing up to 12 carbon atoms, as hexane, octane, cyclohexane, xylene, toluene, benzene and the like; aliphatic ethers and the like such as Cellosolve (trademark of Union Carbide for ethylene glycol monoethyl ether), Cellosolve Acetate, Butyl Cellosolve, and Butyl Cellosolve Acetate and the like.

By "oxygenated" is meant organic solvents such as those for paints that contain oxygen in the molecule of the solvent either as an alcohol, a portion of an acids, an ester, or an ether.

A preferred cleaning composition generally includes the following ingredients within the following ranges in weight percent of the total composition:

a ceramic particulate spherical or conical in shape in an amount of 1–20 wt % (preferably 5–15%) of the total composition; and a liquid organic solvent in an amount of 80–99 wt % (preferably 85–95%) of the total composition, wherein the ceramic particulate is dispersed within the liquid solvent and wherein the solvent also has present in it N-methyl-2-pyrrolidone in an amount of 1–15 wt % (preferably 3–12%) of the total composition.

The organic solvent useful herein also includes the solvent used from the purging of paint spray guns. Such solvents may also have included therein components for decreasing formaldehyde content of the paint coating systems. See U.S. No. 5,200,477, herein incorporated by reference.

Many suppliers provide inorganic particulate matter which would have suitable characteristics for use in this invention. Generally, any spherical or conical shaped inorganic particulate matter having a low density and low specific gravity is suitable. Preferably the density of the inorganic particulates ranges from about 0.2 to about 1.1; even more preferably the mean is approximately the density of the vehicle. The particulates are preferably ceramic such as glass, alumina and the like. The use of Zeelan's Z-LIGHT SPHERES (trademark of Zeelan) worked particularly well. Zeelan's Z-LIGHT SPHERES are composed of silica-alumina ceramic. The spheres have a hollow center with thin walls. The Z-LIGHT SPHERES have an average (mean) specific gravity of approximately 0.7, a compressive strength of approximately 5000 psi, a hardness of 5–6 on the Mohs hardness scale and a mean diameter in microns of approximately 100 microns with a range of 15 to 150 microns. The size profile is:

| 90th percentile | 140 microns |
| 50th percentile | 100 microns |
| 10th percentile | 60 microns |

In addition to the composition disclosed, other additional ingredients may be used for any particular case. The addition of surfactants is acceptable. A surfactant is any compound that reduces surface tension when dissolved in water solutions or which reduces interfacial tension between two liquids, or between a liquid and a solid. The term "surfactant" includes three categories of surface active agents: detergents, wetting agents and emulsifiers. With respect to this invention, these surfactants serve to disperse the inorganic particles within the liquid media.

The addition of thickening agents is also permissible. A thickening agent acts to increase the viscosity of liquid mixtures and solutions to aid in maintaining stability by their emulsifying properties. With respect to the invention, these thickening agents also enhance the dispersion of the inorganic particles by increasing the viscosity of the liquid media.

Other additives may be added to improve the NMP component such as various acids and amines which are described in U.S. No. 4,749,510 hereby incorporated by reference.

Any apparatus or cleaning device can be used with this method. Additionally any range of pressure can be applied, the amount of pressure used to flush the conduit or tube with the cleaning composition is not relevant for purposes of this method.

A useful piece of pumping equipment is a Dynatrack Turbulater (trademark of Plummer Design & Technologies, Inc. of Toledo, Ohio). The equipment is useful for increasing turbulence through a line or conduit to increase cleaning efficiency.

TEST PROCEDURES:

The compositions recited below were all tested under the same laboratory testing conditions. During the laboratory analysis, the liquid media were passed through glass tubes whose interiors had been coated with various automotive paints. Each tube was coated with either a water-based or solvent-based automotive paint. The paint was slowly introduced into the tube and the tube rolled back-and-forth until a continuous coat of paint covered the interior of the tube. The tubes were allowed to dry under ambient conditions for periods ranging from 4 to 56 days. The tubes used had a diameter of approximately ½" and a length of 14".

The liquid media was circulated by means of a laboratory circulation system. The liquid media was circulated through the tube at a flow rate of 2.3 gallons per minute.

The following examples are given for purposes of illustration only and are not to be interpreted as necessarily limiting the invention. All percentages shown are by weight percent of the total composition and all temperatures are degrees F unless otherwise indicated.

TABLE I

MIXTURES TESTED ON WATER-BASED PAINT

| Material | 1 | 2 | 3 | 4 | 5 | 6 |
|---|---|---|---|---|---|---|
| Xylene | 33.0* | 48.5 | 33.0 | 31.0 | 33.0 | 33.0 |
| N-Butyl Acetate | 7.0 | | 6.0 | 5.0 | 7.0 | 6.0 |
| Dibasic Esters | | 17.0 | | | | |
| Isobutyl Isobutyrate | | 24.0 | | | | |
| VM&P Naphtha | | | 6.0 | 5.0 | | |
| Aromatic Naphtha 100 | 9.0 | | 7.0 | 6.0 | 9.0 | 8.0 |
| N-Methyl 2-Pyrrolidone | | | | 5.0 | 5.0 | |
| Methyl Isobutyl Ketone | 19.0 | | 14.0 | 13.0 | 20.0 | 18.0 |
| Toluene | | | 3.0 | 2.0 | | |
| Acetone | 27.0 | | 21.0 | 20.0 | 26.0 | 25.0 |
| N-Butyl Alcohol | | | 3.0 | 2.0 | | |
| Methanol | | | 1.0 | 1.0 | | |
| Z-Light Spheres | 5.0 | 10.5 | 6.0 | 10.0 | | 10.0 |
| Time needed to strip all paint (minutes) | 60+ | 20 | 60+ | 15 | 60+ | 60+ |

*All percentages are by weight percent of the total composition.

The examples varied in their overall cleaning effectiveness. Example 4, having the inorganic particulate matter, the N-methyl-2-pyrrolidone and the liquid media performed the best, removing all of the paint the fastest. Example 2 removed all of the paint from within the glass tubes but took longer than example 4. Examples 1 and 3 removed most of the paint, however paint remained at the ends of the tube and it took a factor of 3–4 times longer to achieve this level of cleaning. Lastly, example 5 removed some of the paint but left behind a thin layer of film even after taking 3–4 times longer than Examples 4 and 2. Example 6 shows cleaning but longer than the preferred Example 4 with the NMP.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method of cleaning tubes or conduits to facilitate the removal of adherent paint materials, comprising:

flushing the tube or conduit with a composition for a sufficient period of time to permit cleaning of the tube or conduit wherein the composition is comprised of:

a ceramic particulate matter, having a density ranging from 0.2 to about 1.1, spherical or conical in shape, in an amount of 1–20 wt % of the total composition; and a liquid medium consisting essentially of a liquid organic solvent in an amount of 80–99 wt % of the total composition, wherein the ceramic particulate is dispersed within the liquid medium.

2. The method of claim 1 further comprising removing the composition and collecting the liquid medium and adherent material as waste.

3. The method of claim 1, wherein the liquid organic solvent is further comprised of aqueous solvent present in an amount of from 1–10 wt % of the composition and the ceramic particulate is selected from the group consisting of silica, alumina, and mixtures thereof.

4. The method of claim 1, wherein the liquid organic solvent is comprised of xylene, acetone, n-butyl acetate, and methyl isobutyl ketone.

5. The method of claim 1, wherein the particulate matter has a thin-walled structure that is hollow within.

6. The method of claim 1, wherein the particulate matter has a particle size less than 200 microns.

7. The method of claim 1, wherein the ceramic particulate matter has a compressive strength that ranges from 4500–5500 psi.

8. The method of claim 1, wherein the ceramic particulate matter has a hardness of 3 or more on the Mohs scale.

9. The method of claim 1, wherein the liquid medium includes a detergent in the amount of 0.5 to 5 wt % of the total composition.

10. The method of claim 1, wherein the liquid medium includes a surfactant in the amount of 0.5 to 10 wt % of the total composition.

11. A method of cleaning a vessel to facilitate the removal of adherent paint materials, comprising:

flushing the vessel with a composition for a sufficient period of time to permit cleaning of the vessel wherein the composition is comprised of:

a ceramic particulate matter, having a density ranging from 0.2 to about 1.1, spherical or conical in shape, in an amount of 1–20 wt % of the total composition; and a liquid medium consisting essentially of a liquid organic solvent in an amount of 80–99 wt % of the total composition, wherein the ceramic particulate is dispersed within the liquid medium.

* * * * *